Aug. 24, 1965 K. W. WEISS 3,201,891
ANGLING DEVICES

Filed Oct. 28, 1963 2 Sheets-Sheet 1

INVENTOR

KARL WILHELM WEISS

By Shoemaker and Mattare
Attys.

Aug. 24, 1965 K. W. WEISS 3,201,891
ANGLING DEVICES

Filed Oct. 28, 1963 2 Sheets-Sheet 2

INVENTOR
KARL WILHELM WEISS
By Shoemaker and Mattare
Attys.

3,201,891
ANGLING DEVICES
Karl Wilhelm Weiss, Heinrich Marschner Strasse 32,
Vaterstetten, near Munich, Germany
Filed Oct. 28, 1963, Ser. No. 319,454
10 Claims. (Cl. 43—34)

The invention relates to an angling device for catching fish or other aquatic animals and incorporating a hook which is to be shot into the fish.

The idea of my invention was prompted by mousetraps. Mice are as timid as fish and have the same rapid movements. The action of mousetraps is based on the fact that the mouse, in order to be caught, need only touch the bait but not swallow it. The simple mechanism of a mousetrap reacts to slight pressure on the bait. The trap would not be as efficient if the mouse had to swallow the bait in order to be trapped.

Fish hooks in the form of a bait reacting to pressure and out of which cocked barbed hooks are shot are known and the subject of prior patents. However, with all such hooks the fish must grasp the bait firmly in order to exert sufficient pressure to release a lock. The fact that the required pressure is necessarily strong and cannot be compared with mere contact is evident when one considers that the cocked hook must not be fired under the forces encountered as it is cast towards the water and impinges thereon. Consequently, these known books catch only a small number of fish, the negative results being due to the fact that fish, particularly tranquil fish, take the bait gently into their mouths.

The aim of my invention is to provide a device that the fish need only touch, in the same way as a mouse touches the bait in a trap, but not swallow it in order to be caught. In providing such an angling device, I was confronted with the problem of how to bring the cocked hooks into the water and/or onto the sea or river bed without the hooks being discharged prematurely, especially when the hooks are to be cast through long distances.

According to the invention, the angling device comprises impelling means for hooks, trigger means responsive to contact by the animals for allowing the hooks to be impelled toward the animals, and water-soluble locking means for immobilizing the trigger means until the angling device is located in water.

Preferably, the water-soluble locking means incorporate means for attracting the aquatic animals.

An example of the invention is illustrated in the accompanying drawings, wherein.

Figure 1:
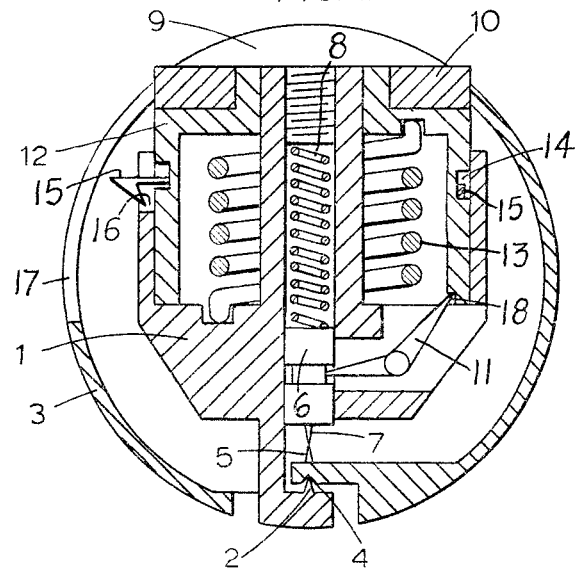
FIG. 1 is a central sectional elevation of an angling device with the water-soluble locking means in place.
Figure 2:
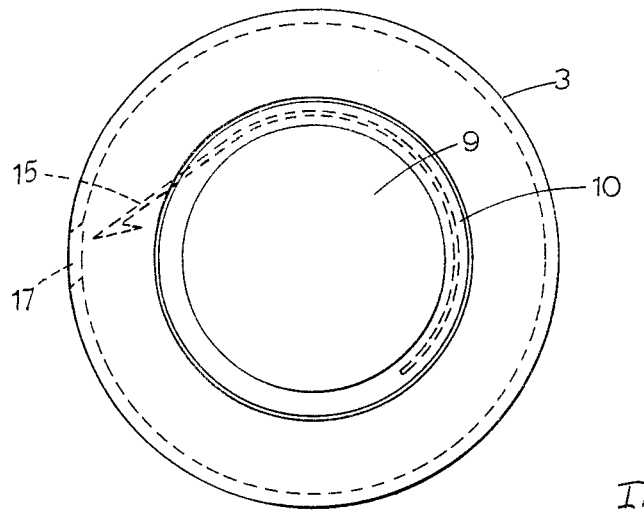
FIG. 2 is a plan view of the device indicating one of the hooks in position preparatory to being shot out.
Figure 4:
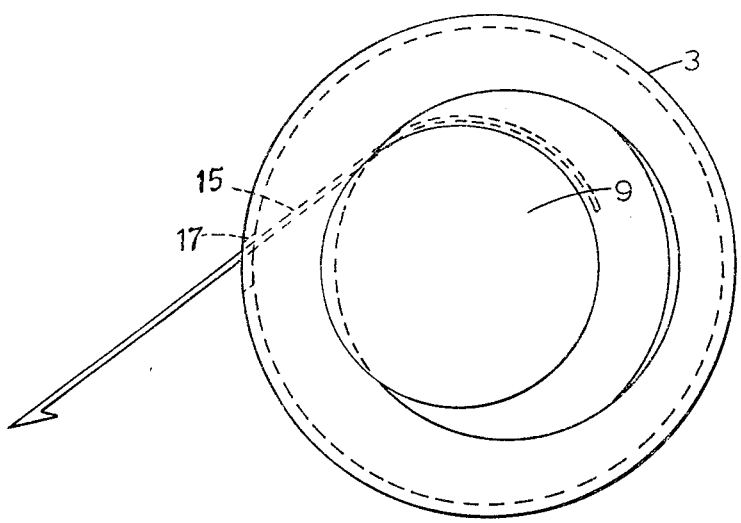
FIG. 4 is a plan view corresponding to FIG. 2 but after the hook has been shot out.

The angling device comprises hook impelling means in the form of a rotary member 12 mounted in the sleeve portion of a holder or body member 1, the rotary member 12 being under the influence of a strong internal spring such as a spiral spring 13 which can be wound up by turning the member 12 as the hooks are being inserted therein. The barbed hooks 15 (only one is shown in FIGS. 2 and 4) are accommodated in a rolled-up condition in grooves 14 in the member 12. In the ready-for-shooting position of FIG. 2, the hooks 15 project through guides 16 in the sleeve of the holder 1 and lie in front of slots 17 provided in a cover member or shell 3 which constitutes trigger means responsive to contact by the fish for allowing the hooks to be flung out by the member 12. At the end opposite the sleeve, the holder 1 is provided with an elongation carrying a pivot pin 2 engaging in a notch 4 of the shell or cover member 3, whereby the shell is permitted to tilt in all directions about the pin 2. Axially of the sleeve, the holder 1 carries a hollow hub on which the member 12 can rotate. The hub contains a compression spring 8 acting on a grooved plunger 6 having a pointed projection 7. A similar projection 5 is provided on the shell 3 and the arrangement is such that the projections 5, 7 abut point-to-point in the ready-for-shooting position shown in FIG. 1. A detent in the form of a pivoted two-armed lever 11 engages with one arm in the groove of the plunger 6 and with the other arm in a recess 18 of the member 12, whereby the latter is prevented from turning under the influence of its aforementioned internal spring 13 to impel the hooks under centrifugal force.

The hollow hub of the holder 1 is closed by a screw 9, the shank of which acts on the spring 8 and the head of which secures locking means in the form of a water-soluble washer or plug 10 of any desired shape in a correspondingly shaped opening in the cover member 3. By means of the washer 10, the cover member 3 is held in a position such that the projections 5, 7 engage end-to-end, i.e. the shell 3 is immobilized (FIG. 1).

Figure 3:
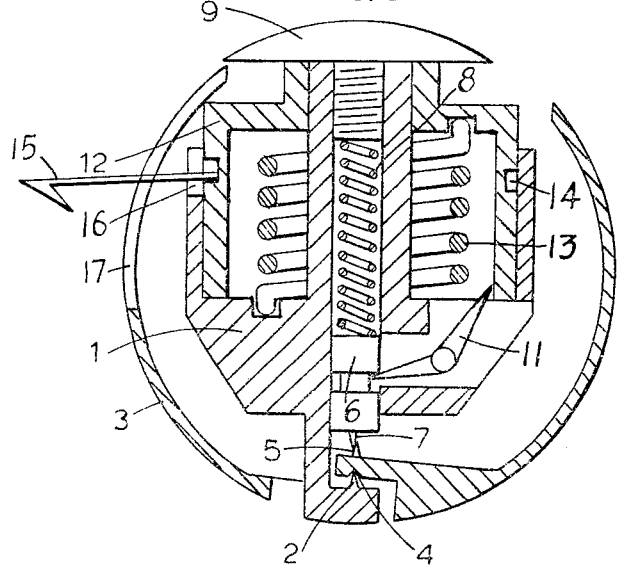
FIG. 3 is a central sectional elevation corresponding to FIG. 1 but showing the device after the locking means has dissolved and after a fish has made contact with the device.

After the angling device is in the water and the washer has dissolved, the cover member 3 is free to be tilted in any direction about the pivot 2 when touched by a fish (FIG. 3). Such tilting causes the projection 7 to jump off the projection 5, whereby the plunger 6 is suddenly depressed under the influence of the spring 8 and the detent 11 is pivoted to release the rotary member 12 which spins under the influence of the aforementioned internal spring and shoots the hooks 15 out through the slots 17 (FIG. 4) to hook the fish that caused the shell 3 to tilt in the first place.

The washer 10 is designed to withstand the impact forces encountered when the device is thrown into the water, so that the shell 3 cannot be displaced until after the device has been in the water for a predetermined period, i.e. until after the washer has dissolved.

According to another aspect of the invention, the angling device comprises means for attracting the aquatic animals that are to be caught by appealing to their senses of vision, hearing, taste, smell and/or touch. It is preferred that some or all of the attracting means be incorporated in the water-soluble locking means and become effective as the locking means is dissolving. Thus, the washer 10 may dissolve in one or more colors selected according to the color and depth of the fishing waters by day or night and the nature of the aquatic animal to be attracted. In order to appeal to the sense of hearing, the washer may, for example, be formed from an Alka-Seltzer eablet or otherwise adapted to dissolve with a hissing noise such as by way of an effervescing additive. Various aromas such as blood, aniseed or other stimulants may be employed and, for the sense of touch, the washer may be adapted to produce pressure or sound waves as by the decomposition of Alka-Seltzer tablets or the like to be propagated towards the animals.

I claim:

1. An angling device for aquatic animals such as fish, comprising a body member, impelling means in said body member, hook means attached to said impelling means for projection through apertures in said body member, trigger means receptive to contact by the animals for actuating the impelling means and causing the hook means to be impelled outwardly toward the animals, and soluble locking means for immobilizing the trigger means until the angling device is located in water, said trigger means comprising a shell tiltable relative to the impelling means and the water-soluble locking means is in the form of a plug located in an opening in the shell to prevent the shell from being tilted while the plug remains undissolved.

2. A device according to claim 1, wherein the shell cooperates with plunger and detent means effective to restrain the impelling means while the shell remains untilted and to release the impelling means when the shell is tilted in response to contact by an animal after said locking means is dissolved.

3. A device according to claim 2, wherein the shell is pivoted on the body member which carries the detent means and the impelling means for the hook means, the shell being apertured to permit the hook means to be impelled therethrough.

4. A device according to claim 1, including means for attracting the aquatic animals.

5. A device according to claim 4, wherein the attracting means are incorporated in the water-soluble locking means and become effective as the latter dissolve.

6. A device according to claim 5, wherein the locking means comprises coloring means which on dissolving of the locking means functions to produce visual phenomena such as color effects.

7. A device according to claim 5, wherein the locking means comprise means which function to emit noise on the dissolving of the locking means.

8. A device according to claim 5, wherein the locking means comprise means which function to emit aromas appealing to the senses of the animals.

9. A device according to claim 5, wherein the locking means comprise means which function to emit pressure waves on dissolving of the locking means.

10. An angling device of the character described, comprising a hollow shell body having a wall, the wall having a first opening and a second opening, said openings being aligned diametrically of the body, slots in said wall between said openings, a hollow rotary member of cylindrical form having a lower open end and having a top end wall having a central opening defined by an outwardly extending rim, a holder for said rotary member, the holder having a circular chamber therein, the chamber having an open top through which the said open end of the rotary member is extended to position the rotary member in the chamber for rotation on its longitudinal axis, said top end wall of the rotary member being in said first opening of the shell body, said holder having a tubular member extending axially thereof through said rotary member and the tubular member having an open top end terminating within said opening in the top end wall of the rotary member and having an open bottom end, the tubular member being interiorly screw threaded in the top end portion thereof, said holder having a bottom extension positioned in the second wall opening of the shell body and carrying a pointed pin directed inwardly on the axial center line of said tubular member, said shell body having an interior wall extension overlying the point of said pin with a notch positioned to receive said point, a body of water soluble material on said top wall of the rotary member and positioned in and engaging the edge of said first opening and, until dissolved, securing said shell body, rotary member and holder against relative movement, a spring in said tubular member, a plunger in said tubular member beneath said spring, a screw threaded in the top end portion of said tubular member and engaging and biasing the spring to urge said plunger toward said interior wall extension of the body, a pair of trigger points carried by said plunger and said wall extension in positions to be set in point-to-point engagement in said axial center line of the tubular member, a pivoted detent carried by the holder and operatively connecting said plunger and said rotary member to secure the rotary member against turning while said trigger points are set, spring driving means coupling the rotary member and the holder, said rotary member being adapted to be rapidly rotated by said spring driving means upon release of the rotary member by said detent, and hook means attached to the rotary member in position to be projetced therefrom through said slots in the body wall upon rotation of the rotary member by the spring driving means.

References Cited by the Examiner
UNITED STATES PATENTS

| | | | |
|---|---|---|---|
| 1,012,528 | 12/11 | Doose | 43—34 |
| 1,172,780 | 2/16 | Ferree | 43—36 |
| 2,799,115 | 7/57 | Reus | 43—43.12 |
| 2,922,244 | 1/60 | Benner | 43—42.06 X |

SAMUEL KOREN, *Primary Examiner.*

ABRAHAM G. STONE, *Examiner.*